United States Patent [19]
Baxter

[11] Patent Number: 5,709,135
[45] Date of Patent: Jan. 20, 1998

[54] CLAM-SHELL SHAPED DIFFERENTIAL HOUSING AND LUBRICATION SYSTEM THEREFOR

[75] Inventor: Ralph W. Baxter, Ft. Wayne, Ind.

[73] Assignee: Dana Corporation, Toledo, Ohio

[21] Appl. No.: 627,267

[22] Filed: Apr. 4, 1996

[51] Int. Cl.⁶ .................................................. F16H 57/02
[52] U.S. Cl. ........................................... 74/607; 475/160
[58] Field of Search ............................... 74/607; 475/160

[56] References Cited

U.S. PATENT DOCUMENTS

| | | | |
|---|---|---|---|
| 805,567 | 11/1905 | Lindsay | 74/607 |
| 832,991 | 10/1906 | Moores | 74/607 |
| 1,631,217 | 6/1927 | Matthews | |
| 2,135,477 | 11/1938 | Griswold | |
| 4,227,427 | 10/1980 | Dick | |
| 4,274,298 | 6/1981 | Ostrander | |
| 4,736,821 | 4/1988 | Ries | |
| 5,232,291 | 8/1993 | Kuan | |
| 5,271,294 | 12/1993 | Osenbaugh | |

*Primary Examiner*—Dirk Wright
*Attorney, Agent, or Firm*—Oldham & Oldham Co., LPA

[57] ABSTRACT

A clam-shell shaped differential housing including a lower portion for receiving the input shaft and the differential gearing, and an upper portion for enclosing the same within the differential housing. The clam-shell shaped differential housing allows for easy insertion and adjustment of the differential components. In addition, a lubricant reservoir may be formed in the area of the input shaft and pinion bearings to retain the majority of differential lubricant. The clam-shell shaped housing allows a pump to be easily positioned in the reservoir between the inner and outer pinion bearings to pump the lubricant from the reservoir to the differential components through channels formed in the housing. In this manner, the sump of the differential housing remains substantially dry. The pump may also be used to provide hydraulic pressure to a limited slip clutch assembly for the actuation thereof in conjunction with a valve control assembly.

20 Claims, 3 Drawing Sheets

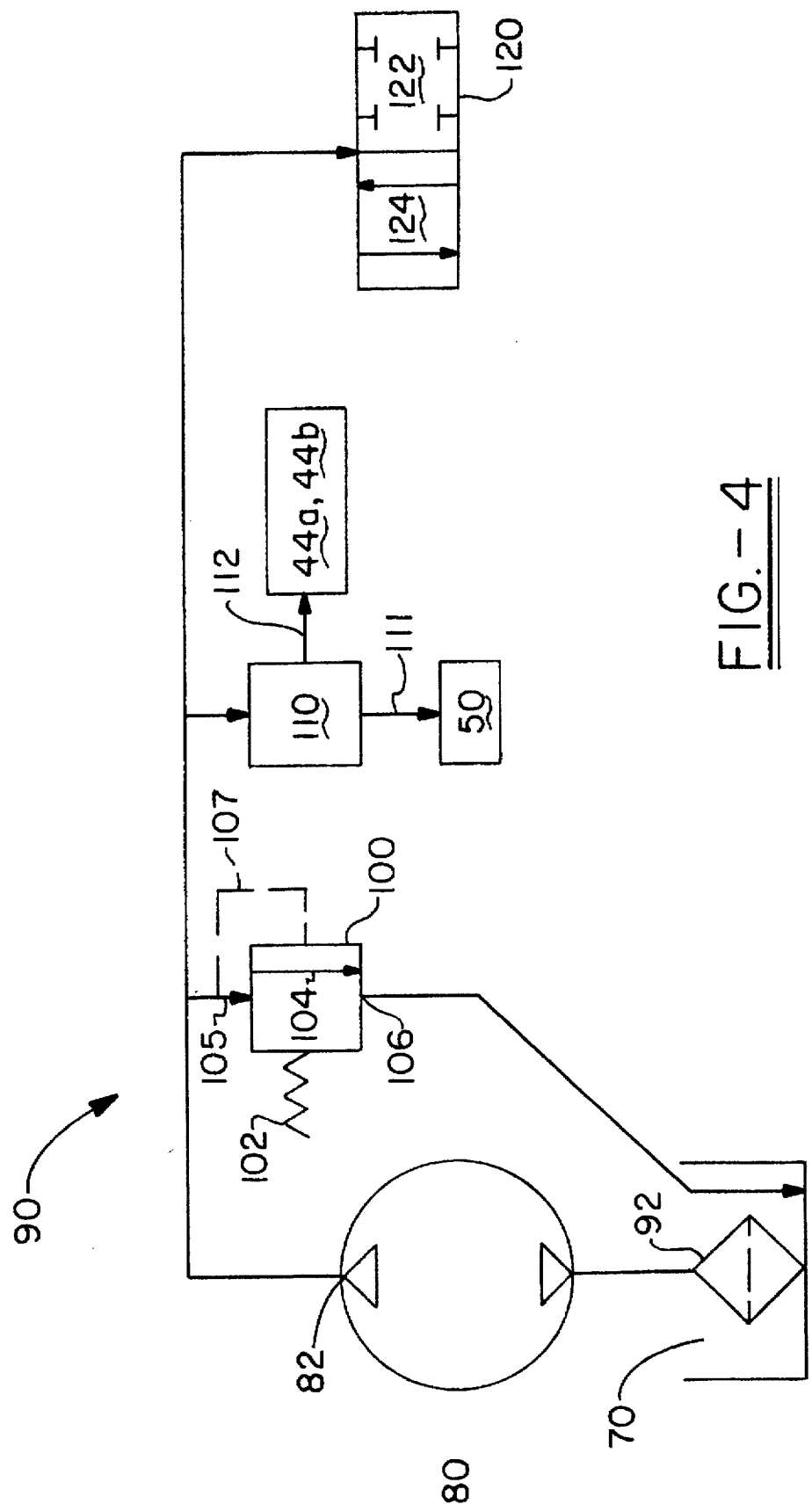

CLAM-SHELL SHAPED DIFFERENTIAL HOUSING AND LUBRICATION SYSTEM THEREFOR

FIELD OF THE INVENTION

The present invention relates generally to a housing for a differential of an automobile or other vehicle, and more specifically to a clam-shell shaped differential housing that provides for easy assembly of and access to the various differential components, particularly the pinion bearings, and also provides the ability to install an improved lubrication system in a differential.

BACKGROUND OF THE INVENTION

Axle assemblies are well known structures which are commonly used in most vehicles. Such axle assemblies include a number of components which are adapted to transmit rotational power from an engine of the vehicle to the drive wheels thereof. Typically, an axle assembly includes a differential gear assembly which is rotatably supported in a non-rotating carrier. The differential is connected between an input drive shaft extending from the vehicle engine and a pair of output drive shafts or axles extending to the vehicle drive wheels. The axle shafts are ordinarily contained within non-rotating tubes which are secured at their inner ends to the differential carrier. Thus, rotation of the differential by the drive shaft causes corresponding rotation of the axle shafts. The differential carrier and the axle tubes extending therefrom form a housing for these drive train components of the axle assembly, inasmuch as the differential and axle shafts are supported for rotation therein.

Differential carriers have heretofore been provided in two main configurations —the unitized carrier construction, commonly referred to as a Salisbury or Spicer axle assembly, and the separable carrier construction, commonly referred to as the banjo-type carrier assembly. The unitized differential carrier is directly connected to the axle tubes, and includes an access opening in the rear portion (opposite the input drive shaft) for the insertion of the differential gearing and other components. This access opening is closed with a cover after the differential components have been assembled within the carrier. With respect to the banjo-type differential carrier, the axle tubes are connected together by a central member which is separate from the carrier. The central member has an opening formed therethrough, usually generally circular in shape. To assemble the axle, the differential components are assembled within the differential carrier, and the carrier is then secured in the opening formed in the central member. A cover is also provided to seal the differential components within the central opening. With both types of differential carriers, once the differential components are assembled therein, the carrier is partially filled with a quantity of lubricating oil. The unitized differential carrier provides a low cost arrangement that is readily adaptable to a wide variety of vehicles, while the banjo-type differential carrier allows the carrier and differential components to be removed from the vehicle without disturbing the axle tubes and associated vehicle components.

While known differential housings are generally acceptable, there are certain drawbacks associated with each variety. For example, there has been found a need to provide a differential housing design that is light weight, yet sufficiently rigid. Also, known differential housings generally provide only very limited access to the differential components contained therein. Assembly and adjustment of the differential components, especially the "pinion" bearings rotatably supporting the input shaft to the differential, is complicated by these known designs wherein the only access to the differential components is provided by the access opening and cover opposite the input shaft.

Also, it has been found that known arrangements wherein the differential housing is partially filled with a large quantity of lubricating oil to form a "sump" actually lead to an increased amount of heat being trapped within the differential housing by the oil. Furthermore, the constant rotation of the differential components within the quantity of oil cause the oil to become aerated, resulting in a loss of lubricating ability. Another drawback associated with known differential housing designs is that the rear cover, which is bolted to the differential housing along with a gasket, forms a seam with the differential housing that may leak over time.

As mentioned, current designs for differential housings limit one's access to the torque input shaft of the differential, the drive pinion secured to the innermost end of the input shaft, and the pinion bearings that support the input shaft for rotation relative to the housing (generally an inner and outer roller bearing assembly). This limited access makes it difficult to position the various components, and makes the subsequent adjustment thereof difficult as well. Current designs also limit the types of pinion bearings that may be utilized to support the input shaft. For example, the limited access in the area of the pinion bearings does not allow for the use of bearing caps which are a convenient arrangement for providing the pinion bearing assemblies.

In certain applications, it is necessary that the lubricating fluid found within the differential housing be pumped to locations within the differential housing where it may not naturally flow, or the fluid may be pumped to remote locations for use in lubricating various components, or as a hydraulic fluid to actuate pistons and the like. For example, lubricating fluid may be pumped from the differential housing, through the axle tubes, to the wheel end assemblies for use in wet brakes. A gerotor pump has been used in conjunction with the rotating input shaft to create the necessary hydraulic pressure. In one arrangement, the gerotor pump is secured about the input shaft exterior to the differential carrier at the point where the input shaft enters the differential housing. Suction lines are provided from the pump to the "sump" area of the differential housing. However, it has heretofore been difficult and impracticable to locate the gerotor pump on the input shaft, between the inner and outer pinion bearings. As is described hereinbelow, such a placement of the gerotor pump eliminates the need for suction lines to a sump, and eliminates the need to maintain a large quantity of lubricating fluid within the sump. Locating the gerotor pump within the differential housing also allows the differential to be more compact.

SUMMARY OF THE INVENTION

The present invention is therefore directed to a clam-shell shaped differential housing comprising a lower portion for receiving differential components, and an upper portion for enclosing the differential components within the differential housing. The lower portion of the housing comprises an upwardly open central section for rotatably receiving and supporting the differential case and associated components and first and second trunnions extending therefrom for receiving axle shaft housing tubes. The lower portion also includes an upwardly open input shaft support region for receiving and rotatably supporting an input shaft and the associated pinion gear coupled to rotate therewith. The upper portion of the differential housing is provided to seal the lower portion such that when in position, a differential gearing chamber is defined within the differential housing. In a preferred embodiment, the differential housing includes a reservoir formed in the region of the input shaft and a gerotor pump is provided about the input shaft to be driven thereby. The gerotor pump is used to pump the lubricating fluid to the various differential components, such that it the overall amount of lubricant maintained in the differential housing can be substantially reduced. Also, the gerotor pump may be utilized to provide hydraulic pressure to a clutch assembly of a limited slip differential.

The present invention provides the advantage of an easy to assemble differential that is strong and lightweight, and that allows for the simple addition of a reservoir and pump in association with the input shaft so that the amount of lubricating fluid in the differential can be reduced without reducing the amount of lubricating fluid flowing to the various differential components.

BRIEF DESCRIPTION OF THE DRAWINGS

FIG. 4 schematically illustrates a lubrication system that may be used in conjunction with the clam-shell shaped differential housing of the present invention.

DETAILED DESCRIPTION OF THE INVENTION

Figure 1:
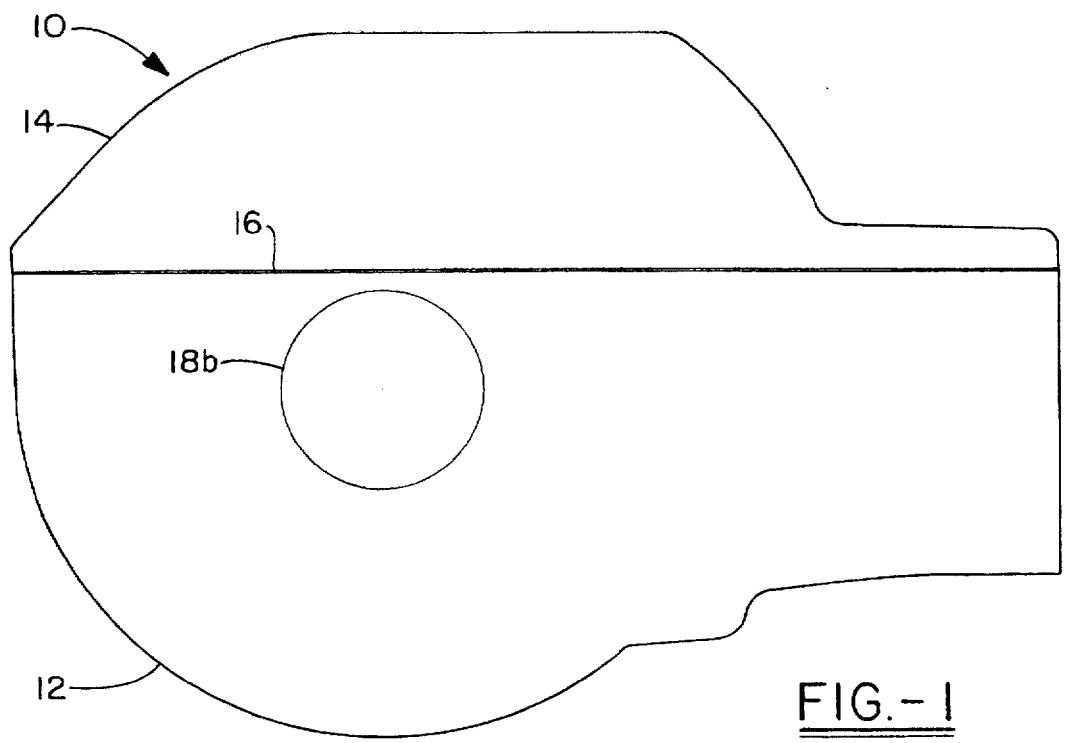
FIG. 1 is a side elevational view of a differential housing in accordance with the present invention.
Figure 3:
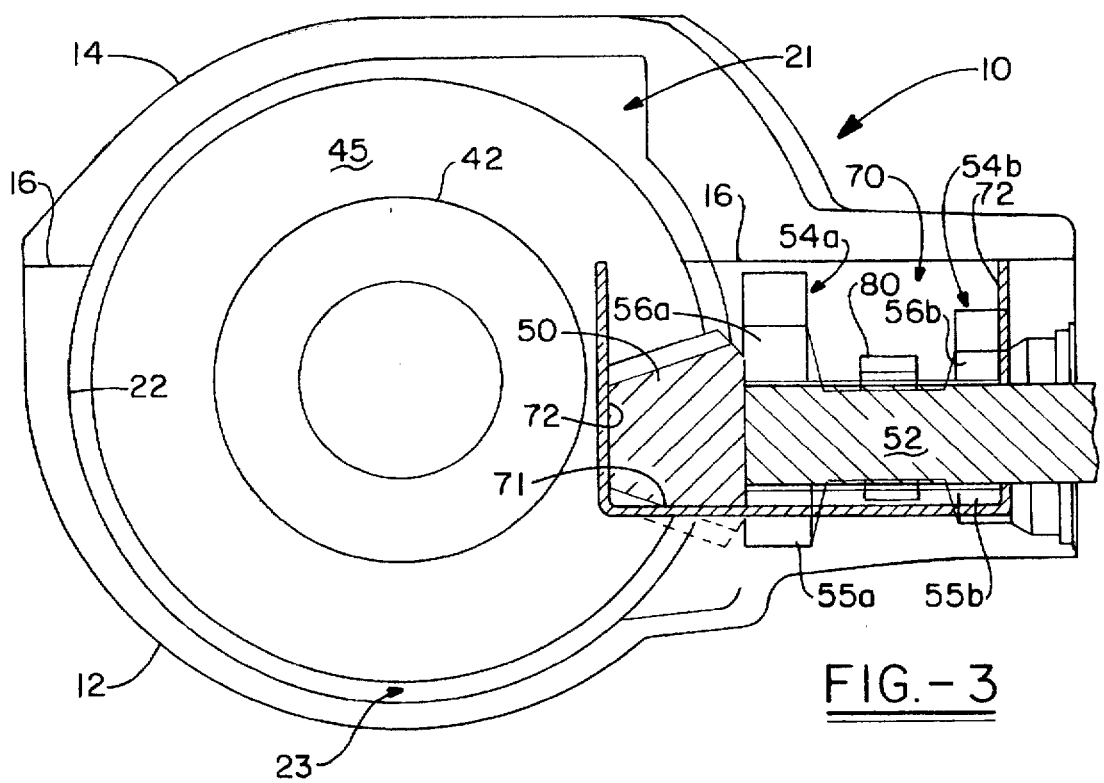
FIG. 3 is a cross-sectional view of the differential shown in FIG. 2.
Figure 2:
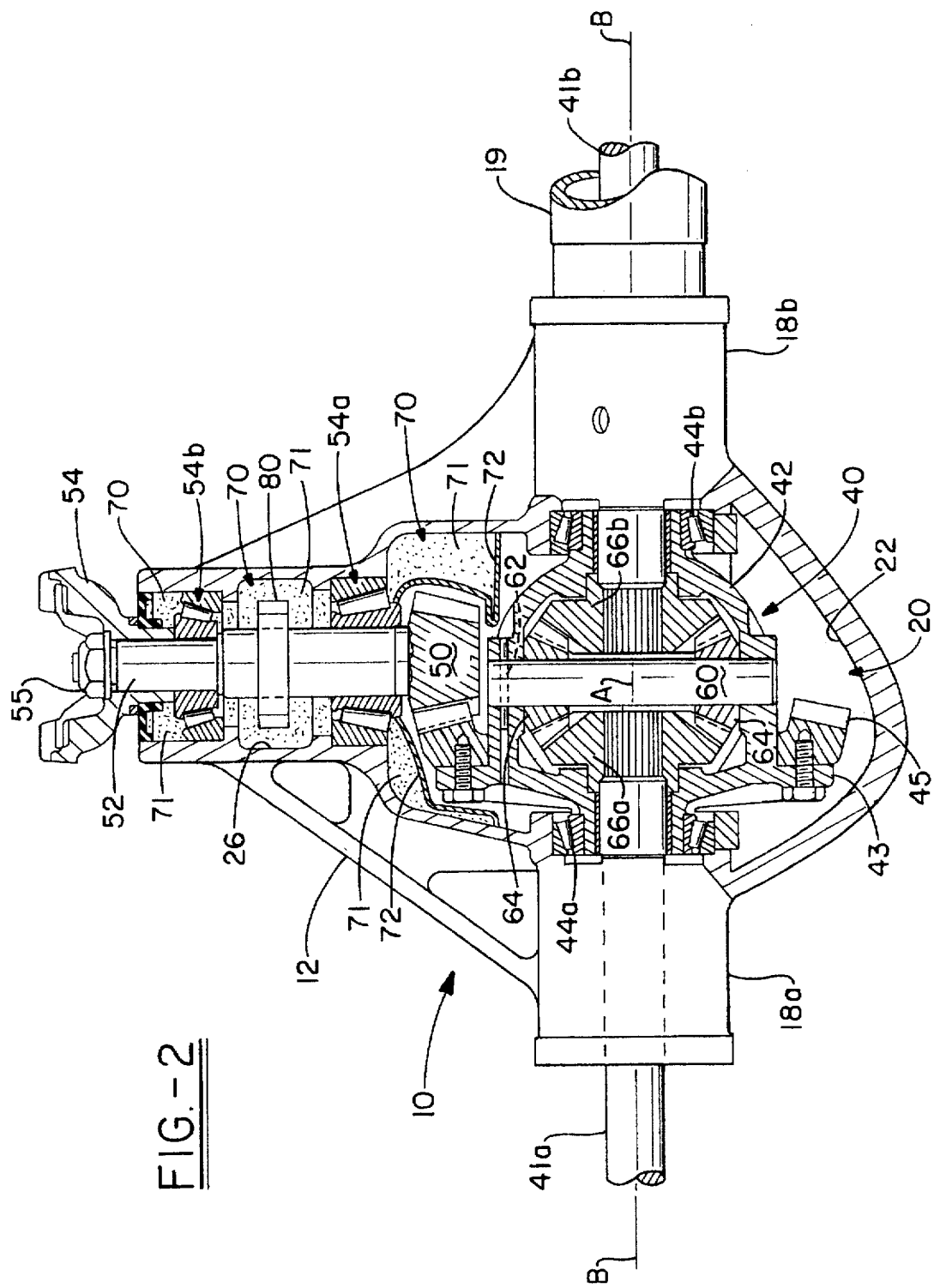
FIG. 2 shows a top view of a clam-shell shaped differential in accordance with the present invention with the top portion thereof removed to reveal the differential gearing and other components contained therein.

A clam-shell shaped differential housing in accordance with the present invention is shown generally at 10 in FIGS. 1-3 and comprises a lower portion 12 into which the differential components are placed (as shown in FIG. 2) and an upper or cover portion 14 to mate with the lower portion 12 so that the differential gearing components 40 are encased within housing 10. Upper portion 14 is bolted or otherwise secured to lower portion 12 such that a seam 16 is formed therebetween. The connection of upper portion 14 to lower portion 12 in this manner creates a generally hollow differential gearing chamber 20 within housing 10. It can be seen that the manner in which the lower and upper portions 12, 14 of the differential housing 10 are joined together is similar to the two halves of a clam shell, and thus, the differential housing 10 is referred to herein as a clam-shell shaped differential housing. Differential housing 10 also includes trunnions 18a, 18b extending from opposing lateral sides thereof to respectively receive axle tubes 19 (only one shown) to house the axle shafts 41a, 41b as discussed above.

The clam-shell like structure of housing 10 provides a wide variety of advantages over differential housings heretofore known. For example, the clam-shell shaped housing disclosed herein is thought to be more rigid and strong than known differential housings, which allows for the use of less dense or "lighter" alloys in the construction thereof. One of the most significant advantages is that with the upper portion 14 removed from lower portion 12 as is shown in FIG. 2, the placement of the differential gearing and associated components 40 into the differential housing 10 is greatly simplified. The components 40 may simply be laid into the lower portion 12, which, when upper portion 14 is removed therefrom, comprises a upwardly open hollow central portion 22 into which the differential components, such as a differential case 42 may be received and supported for rotation. Lower portion 12 also includes an upwardly open input shaft support region 26 into which an input shaft 52 and its associated components (as explained in detail below) may be easily laid when upper portion 14 is removed from lower portion 12.

In addition to the differential case 42 rotatably supported within the differential housing 10 by bearing assemblies 44a, 44b, the differential components 40 include a differential case driving gear such as ring or face gear 45 connected to rotate with differential case 42 through an annular flange 43 extending from case 42 with the use of bolts 46 or the like. Gear 45 is in meshing engagement with a pinion gear 50 which is coupled to rotate with input shaft 52 on the innermost end thereof. Shaft 52 is supported for rotation relative to housing 10 by inner and outer bearing assemblies 54a, 54b, commonly referred to inner and outer pinion bearing assemblies, respectively.

Referring now primarily to FIG. 2, it can be seen that input shaft 52 includes a yoke 54 secured to rotate with shaft 52 through the use of a nut 55. Yoke 54 is effective for receiving torque from a driving member (not shown) of the motor vehicle of which differential 10 is a part. As is generally known in the art, differential gearing 40 and the associated components described herein are effective for transferring torque from input shaft 52 to first and second output or axle shafts 41a, 41b which are in turn drivingly coupled to the road wheels (not shown) of the motor vehicle. Torque is transferred to output shafts 41a, 41b via differential gearing 40 in a conventional manner so as to permit differential rotation between shafts 41a, 41b. The centerline axis A about which differential case 42 rotates is coincident with the longitudinal centerline axis B about which the first and second output shafts 41a, 41b rotate. When torque is transmitted to input shaft 52 through yoke 54, rotation of pinion 50 causes rotation of gear 45, which in turn causes rotation of differential case 42 within differential housing 10. The differential case 42 includes at least one cross shaft or pin 60 having opposing ends positioned in bores formed in the rotatable case 42. Shaft 60 is retained in case 42 by a locking pin 62.

The differential gearing 40 further comprises a pair of pinion gears 64 (commonly referred to as pinion mates) rotatably supported on each end of cross shaft 60, and a pair of side gears 66a, 66b, preferably provided in the form of bevel gears, respectively coupled to rotate with output shafts 41a, 41b. Each side gear 66a, 66b is meshingly engaged with the pinion mates 62. Accordingly, rotation of case 42 about axis A in response to the transmission of torque to input shaft 52 results in rotation of at least one of the output shafts 41a, 41b. The interrelationship among pinion gears 64, side gears 66a, 66b, and output shafts 41a, 41b, permits differential, or relative, rotation to exist between output shafts 41a, 41b which is required during certain vehicle operations such as cornering.

It can be seen that differential 10, in accordance with the present invention, preferably includes a fluid retaining region or reservoir 70 formed therein throughout the input shaft support region 26 such that the majority of lubricating fluid within differential housing 10 is retained in reservoir 70. Reservoir 70 is upwardly open and defined by sidewalls 72, floor 71, and input shaft support region 26 of differential housing 10. In this manner, gear 45, differential case 42, pinion gears 62, side gears 66a, 66b and other differential components located in central section 22 of differential housing 10 are not submerged in a large quantity of lubricating fluid (with the associated drawbacks as discussed above). Instead, a pump, such as a gerotor pump 80 is provided in fluid communication with reservoir 70, preferably at least partially submerged therein to pump lubricating fluid from reservoir 70 through channels (not shown) formed in housing 10 and/or other conduits, to the various differential components in need of lubrication. Pump 80 is driven by input shaft 52 and therefore, lubricating fluid is pumped any time input shaft 52 is rotated. As is shown in FIG. 3, those skilled in the art will recognize that as lubrication fluid is pumped throughout the differential housing 10, it will drain into the sump region 23 of housing 10. As a sufficient quantity of lubricating fluid collects in the sump region to contact gear 45, the teeth (not shown) of gear 45 will collect the lubricating fluid and carry the same upward until it is "spun" off of the gear 45 into the upwardly open reservoir 70. In addition to the advantages of this "dry sump" system discussed above, it can be seen that the gear 45 is not required to stir a large amount of lubricating fluid, and that the reservoir allows the air bubbles to exit the fluid before it is once again pumped throughout the housing 10.

Another advantage associated with clam-shell shaped differential housing 10 is that the upwardly open input shaft support region 26 of lower portion 12 allows for the easy installation into region 26 of the input shaft 52, the inner and outer pinion bearings 54a, 54b, and the gerotor pump 80 in a manner similar to that discussed above with respect to the insertion of differential case 42 into region 22. Also, the engagement between pinion gear 50 and gear 45 is easily adjusted. Finally, as is shown in FIG. 3, the upwardly open input shaft support region allows the inner and outer pinion bearings 54a, 54b to be provided in the nature of two-part bearing assemblies, respectively having lower portions 55a, 55b onto which the input shaft is laid, and upper portions 56a, 56b, commonly referred to as bearing caps, that are simply bolted to lower portions 55a, 55b, respectively, once the position of input shaft 52 within housing 10 has been adjusted as desired. The enclosed nature of known differential housings in the area of the input shaft and associated bearings makes the use of these bearing caps difficult and impracticable. Also, the installation of the gerotor pump 80 is much simplified by the open nature of the input shaft support region 26 of lower portion 12 of housing 10. Once the components are positioned as desired, the required amount of lubricating fluid is poured into housing 10, and upper portion 14 is connected to lower portion as described above. A suitable gasket or sealing compound is preferably located at the seam 16 between the upper and lower portions 12, 14 of housing 10. However, the present housing has much less of a tendency to leak lubricating fluid due to the fact that, unlike known differential housings, the entire seam 16 is above the level of the lubricating fluid.

Referring now to FIG. 4, there can be seen a schematic representation of a lubrication/hydraulic system in accordance with the present invention. The formation of reservoir 70 as described above, allows for the simple and easy installation of lubrication system 90 within differential housing 10. Specifically, pump 80 is in fluid communication with reservoir 70 (preferably by being at least partially submerged therein), and a filter 92 is provided between pump 80 and reservoir 70 to filter metal shavings, dirt, and other contaminants from the lubrication fluid. A pressure regulator valve 100 is positioned in fluid communication with outlet 82 of pump 80 and reservoir 70 such that, upon the occurrence of excessive hydraulic pressure in the lubrication system 90, lubrication fluid is pumped from outlet 82 of pump 80 back to reservoir 70 such that the excessive system pressure is relieved. As shown herein, pressure relief valve 100 is normally closed under the force of spring 102. However, when excessive hydraulic pressure develops at pump outlet 82 (and consequently at regulator 100), spring 102 becomes compressed under fluid pressure, and component 104 of regulator 100 becomes aligned with inlet and outlet 105, 106 of regulator 100 such that fluid communication is allowed from pump outlet 82 to reservoir 70 through regulator 100.

As discussed above, upon rotation of input shaft 52, pump 80 pumps lubrication fluid from reservoir 70 to various regions and components within differential housing 10 as required. Specifically, outlet 82 of pump 80 is in fluid communication with pinion gear 50 through valve assembly 110 and conduit 111, such that pressurized lubrication fluid is directed onto pinion gear 50. Outlet 82 of pump 80 is also in fluid communication with bearings 44a, 44b and other differential components as described through conduit 112. As described above, the conduits shown in FIG. 4 may simply be channels formed in differential housing 10. Lubrication of the bearings 44a, 44b pinion gear 50, and other components with lubricant supplied under pressure from outlet 82 of pump 80 is superior to known differential lubrication systems wherein these components are merely "splash" lubricated.

In an alternate embodiment, differential housing 10 also includes therein the required components to act as a limited slip differential as is well known in the art. In such an alternative embodiment, lubrication system 90 may also function as a hydraulic actuation system for the limited slip clutch assembly, with the lubrication fluid acting as the hydraulic fluid. Because pump 80 pumps anytime input shaft 52 rotates, a limited slip clutch actuation valve control assembly 120 is provided to selectively block/unblock fluid communication of lubricating fluid from outlet 82 of pump 80 to the piston assembly (not shown) of the limited slip clutch assembly (not shown). As is generally known in the art of limited slip differentials, when one road wheel of the vehicle spins or "differentiates," the limited slip clutch assembly becomes actuated to thereby lock the differential gearing components, thus causing both road wheels to rotate at the same speed. Valve control assembly 120 is normally closed (as indicated at 122) to allow differentiation between the vehicle road wheels as is required during normal vehicle operations. However, upon the occurrence of excessive differentiation, as might occur when one or both road wheels are presented with ice or another surface having a low coefficient of friction, valve control assembly 120 allows the hydraulic lubrication fluid to flow under pressure to the piston assembly of the limited slip clutch assembly such that the clutch assembly is actuated.

Those skilled in the art will recognize that the foregoing description has set forth the preferred embodiment of the invention in particular detail and it must be understood that numerous modifications, substitutions and changes can be undertaken without departing from the true spirit and scope of the present invention as defined by the ensuing claims.

What is claimed is:

1. A clam-shell shaped differential housings, comprising:
   a lower portion for receiving differential components, said lower portion including an upwardly open central section for rotatably receiving a differential case, and including an upwardly open input shaft support region for rotatably receiving a torque input shaft;
   an upper portion for connection to said lower portion to thereby enclose said upwardly open central section and said upwardly open input shaft support region such that a generally hollow differential gearing chamber is defined within said clam-shell shaped differential housing; and a lubricant reservoir formed in said input shaft support region of said differential housing.

2. A differential housing as recited in claim 1, further comprising first and second trunnions extending from opposing lateral sides of said differential housing.

3. A differential, comprising:

a housing including a lower portion for receiving differential components, said lower portion including an upwardly open central section for rotatably receiving a differential case, said housing further including an upwardly open input shaft support region for rotatably receiving a torque input shaft to said differential housing, and said holding including an upper cover portion for mating with said lower portion to enclose said upwardly open input shaft support region and said upwardly open central section of said lower portion such that a differential gearing chamber is defined within said differential housing;

a lubricant reservoir formed in said input shaft support region of said differential housing;

a differential case rotatably supported within differential gearing chamber and including a drive gear connected to rotate therewith; and an input shaft rotatably supported in said input shaft support region of said housing, said input shaft including a pinion gear in meshing engagement with said drive gear of said differential case.

4. A differential as recited in claim 3, further comprising a pump driven by said input shaft and in fluid communication with said lubricant reservoir.

5. A differential as recited in claim 4, wherein said input shaft is supported for rotation relative to said differential housing by inner and outer bearing assemblies positioned in said input shaft support region of said housing, and wherein said pump is located at least partially within said reservoir between said inner and outer bearing assemblies.

6. A differential as recited in claim 5, wherein said pump includes at least one fluid outlet, and wherein said differential housing includes at least one lubricant channel formed therein in fluid communication with said at least one fluid outlet of said pump such that lubricant is communicated under pressure from said reservoir through said at least one lubricant channel by said pump.

7. A differential as recited in claim 5, wherein said pump is a gerotor pump positioned about and driven by said input shaft.

8. A differential as recited in claim 4, wherein said differential is a limited slip differential further comprising a limited slip clutch actuation valve control assembly in fluid communication with said fluid reservoir and in fluid communication with a piston assembly of a limited slip clutch assembly, wherein said valve control assembly provides selective fluid communication of fluid said pump outlet to said piston.

9. A differential as recited in claims 3, wherein said input shaft is supported for rotation relative to said differential housing by inner and outer bearing assemblies positioned in said input shaft support region of said housing.

10. A differential as recited in claim 4, wherein said pump is located at least partially within said lubricant reservoir.

11. A differential as recited in claim 10, wherein said pump includes at least one fluid outlet, and wherein said differential housing includes at least one lubricant channel formed therein in fluid communication with said at least one fluid outlet of said pump such that lubricant is communicated under pressure from said reservoir through said at least one lubricant channel by said pump.

12. A differential as recited in claim 4, wherein said pump is a gerotor pump.

13. A differential as recited in claim 4, wherein said pump is a gerotor pump positioned about and driven by said input shaft.

14. A differential as recited in claim 5, wherein said pump is a gerotor pump.

15. A differential as recited in claim 6, wherein said pump is a gerotor pump positioned about and driven by said input shaft.

16. A differential as recited in claim 6, wherein said pump is a gerotor pump.

17. A differential as recited in claim 5, wherein said differential is a limited slip differential further comprising a limited slip clutch actuation valve control assembly in fluid communication with said fluid reservoir and in fluid communication with a piston assembly of a limited slip clutch assembly, wherein said valve control assembly provides selective fluid communication of fluid from said pump outlet to said piston.

18. A differential as recited in claim 6, wherein said differential is a limited slip differential further comprising a limited slip clutch actuation valve control assembly in fluid communication with said fluid reservoir and in fluid communication with a piston assembly of a limited slip clutch assembly, wherein said valve control assembly provides selective fluid communication of fluid from said pump outlet to said piston.

19. A differential as recited in claim 7, wherein said differential is a limited slip differential further comprising a limited slip clutch actuation valve control assembly in fluid communication with said fluid reservoir and in fluid communication with a piston assembly of a limited slip clutch assembly, wherein said valve control assembly provides selective fluid communication of fluid from said pump outlet to said piston.

20. A differential as recited in claim 10, wherein said differential is a limited slip differential further comprising a limited slip clutch actuation valve control assembly in fluid communication with said fluid reservoir and in fluid communication with a piston assembly of a limited slip clutch assembly, wherein said valve control assembly provides selective fluid communication of fluid from said pump outlet to said piston.

* * * * *